J. W. BROCKWAY.
STRAW CUTTER.
No. 82,685.  Patented Oct. 6, 1868.
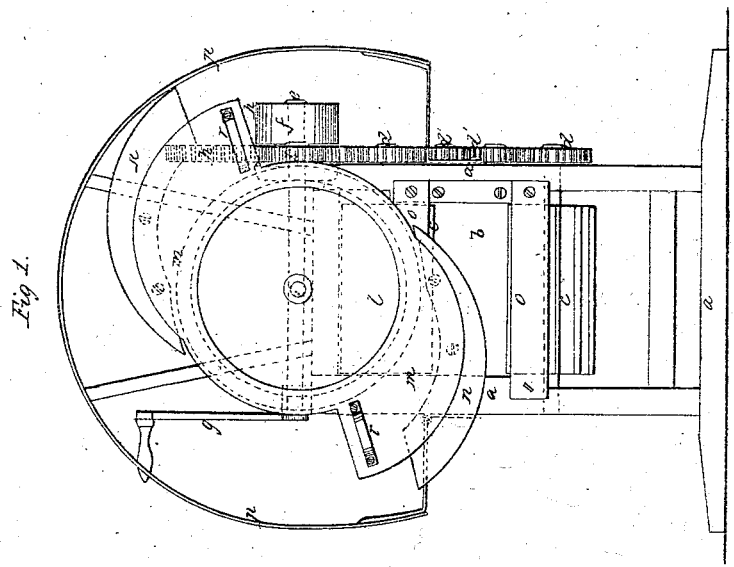
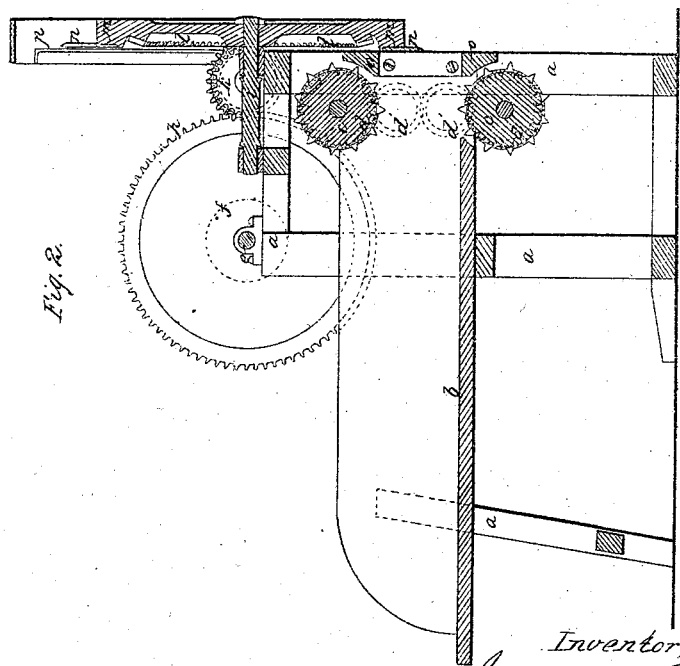
Witnesses,
Geo. D. Walker
Chs. H. Smith
Inventor;
Joseph W. Brockway
per L. W. Serrell
Att.

United States Patent Office.

JOSEPH W. BROCKWAY, OF NEW YORK, N. Y.

Letters Patent No. 82.635, dated October 6, 1868.

---

IMPROVEMENT IN STRAW-CUTTERS.

---

The Schedule referred to in these Letters Patent and making part of the same.

---

TO ALL WHOM IT MAY CONCERN:

Be it known that I, JOSEPH W. BROCKWAY, of the city, county, and State of New York, have invented and made a certain new and useful Improvement in Cutters for Straw, Hay, &c.; and I do hereby declare the following to be a full, clear, and exact description of the said invention, reference being had to the annexed drawing, making part of this specification, wherein—

Figure 1 is an elevation at the end of the machine.

Figure 2 is a section transversely of the feeding-rollers.

Similar marks of reference denote the same parts.

I make use of a revolving stock, carrying a cutter or cutters placed diagonally to the radial line, and apply the same to a feeding-trough in such a manner that the knife or cutter acts with a drawing cut upon the straw or similar material, to separate the same into short sections.

The knife in its movement operates diagonally to the stationary metallic edges at the end of the trough, so as to cut like shears.

In the drawing—

$a$ is a frame, supporting the trough, $b$, that is of suitable size and shape, and $c\ c$ are feeding-rollers, geared together at $d\ d$, as seen in fig. 1.

These rollers $c\ c$ are formed with longitudinal ribs on their surfaces, so as to act upon the straw or other material, and feed the same with regularity through the trough to the cutters.

The main shaft, $e$, of the machine is driven by power applied to the pulley $f$, or by the hand-crank, $g$, and $h$ is a gear-wheel that acts upon the upper gear, $d$, of the feed-roller $c$; and I find it preferable to connect the gears $d\ d$ by the intermediate gears $d'\ d'$, to prevent said gears $d$ being so large.

$k$ is a compound pinion, formed with straight teeth, taking the wheel $h$, and bevel-teeth taking the bevel-wheel $l$ on the back of the cutter-stock $m$, that is mounted at the end of the shaft $i$, set in bearings upon the frame of the machine.

The cutter-stock $m$ carries the cutters, $n$, that are placed diagonally, as shown in fig. 1, so as to act with a drawing and shearing cut upon the straw, and $o\ o$ are metallic bars, forming the end of the trough $b$, and against which the knives act like shears in completing the cutting-operation.

The guard $p$ surrounds the knives $n$, to prevent injury to the attendant. I prefer that this guard be stationary, and rather more than a half circle, as shown, but the same might be made as a circle, and attached by arms to the stock $m$.

I prefer that the cutters $n$ be formed as the arc of a circle, as shown, but the cutting-edge might be straight, the diagonal position being maintained so as to act with a shearing cut.

The stock $m$ is to conform generally to the shape of the cutters $n$, with a wing or wings extending out from the central portion, and upon the outer portions, handles $r\ r$ are affixed, so that the cutters can be reciprocated by a direct application of hand-power to the same, instead of the cutters being revolved.

If desired, the gearing can be disconnected, so that the cutters alone will be moved when reciprocated by hand.

What I claim, and desire to secure by Letters Patent, is—

1. The cutter $n$ and stock $m$, in combination with the handle $r$, applied directly to such cutter or stock, so that the same can be vibrated by hand, and swing in contact with the bars $o\ o$ at the end of the feeding-trough, substantially as set forth.

2. The arrangement of gearing $h$, $d$, $d'$, $k$, and $l$, in combination with the feed-rollers $c\ c$, cutter-stock $m$, and cutters $n$, as and for the purposes set forth.

In witness whereof, I have hereunto set my signature, this twenty-fourth day of April, 1868.

JOSEPH W. BROCKWAY.

Witnesses:
 CHAS. H. SMITH,
 GEO. T. PINCKNEY.